United States Patent
Abouzour et al.

(10) Patent No.: US 9,753,780 B2
(45) Date of Patent: Sep. 5, 2017

(54) TOPOLOGY-AWARE PROCESSOR SCHEDULING

(71) Applicant: SYBASE, INC., Dublin, CA (US)

(72) Inventors: Mohammed Abouzour, Ontario (CA); John Smirnios, Ontario (CA)

(73) Assignee: SYBASE, INC., Dublin, CA (US)

( * ) Notice: Subject to any disclaimer, the term of this patent is extended or adjusted under 35 U.S.C. 154(b) by 0 days.

(21) Appl. No.: 14/793,234

(22) Filed: Jul. 7, 2015

(65) Prior Publication Data
US 2017/0010920 A1 Jan. 12, 2017

(51) Int. Cl.
*G06F 9/46* (2006.01)
*G06F 9/50* (2006.01)
*G06F 9/48* (2006.01)

(52) U.S. Cl.
CPC .......... *G06F 9/5044* (2013.01); *G06F 9/4843* (2013.01)

(58) Field of Classification Search
None
See application file for complete search history.

(56) References Cited

U.S. PATENT DOCUMENTS

| | | | | | |
|---|---|---|---|---|---|
| 6,427,161 | B1* | 7/2002 | LiVecchi | ............... | G06F 9/4881 718/102 |
| 6,996,822 | B1* | 2/2006 | Willen | ................. | G06F 9/5083 711/100 |
| 8,122,132 | B2* | 2/2012 | Arimilli | ............... | G06F 9/5088 709/223 |
| 8,438,572 | B2* | 5/2013 | Fecioru | ................ | G06F 9/4881 718/100 |
| 2010/0107172 | A1* | 4/2010 | Calinescu | ............. | G06F 9/5061 718/104 |
| 2012/0131591 | A1* | 5/2012 | Moorthi | ................. | G06Q 30/00 718/104 |
| 2014/0068621 | A1* | 3/2014 | Sitaraman | ............... | G06F 9/505 718/102 |

* cited by examiner

*Primary Examiner* — Gregory A Kessler
(74) *Attorney, Agent, or Firm* — Schwegman Lundberg & Woessner, P.A.

(57) ABSTRACT

In an example embodiment, a method of operating a task scheduler for one or more processors is provided. A topology of one or more processors is obtained, the topology indicating a plurality of execution units and physical resources associated with each of the plurality of execution units. A task to be performed by the one or more processors is received. Then a plurality of available execution units from the plurality of execution units is identified. An optimal execution unit is then determined, from the plurality of execution units, to which to assign the task, based on the topology. The task is then assigned to the optimal execution unit, after which the task is sent to the optimal execution unit for execution.

18 Claims, 6 Drawing Sheets

TOPOLOGY-AWARE PROCESSOR SCHEDULING

TECHNICAL FIELD

This document generally relates to methods and systems for use with computer processors. More particularly, in example embodiments, this document relates to the topology-aware scheduling of processor tasks.

BACKGROUND

Modern processors such as central processing units (CPUs) support a number of execution units (threads, cores, sockets, etc.). Experimentation with various benchmarks shows that not all execution units have the same efficiency for a given set of tasks. For example, there is a cost for accessing memory across sockets. Additionally, multiple tasks assigned to threads of the same core may be inefficient if other cores are available. By scheduling available execution units onto threads randomly or otherwise in a "dumb" manner, performance is not maximized.

BRIEF DESCRIPTION OF DRAWINGS

The present disclosure is illustrated by way of example and not limitation in the following figures.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a specialized task scheduler is provided for a processor. This specialized task scheduler considers the topology of the system when making scheduling decisions. This topology may include the layout of cores, memory, sockets, caches, and the like. Use of the knowledge of this topology allows the specialized task scheduler to schedule tasks not only to components that happen to be free but to components that use other components that are free.

For example, in a system having two sockets, each having two cores with two threads per core, the task scheduler may decide to schedule two tasks such that each task uses its own socket. This way each task can utilize multiple caches that exist at the core and socket level without the need to share those caches with the other task. In an example embodiment, a static policy for topology-aware scheduling could be used in which the nature of the underlying task is ignored or unknown and the topology itself is utilized as the main factor in the scheduling. In another example embodiment, the nature of the task (i.e., the underlying work the task is performing) is analyzed and this nature is compared with the nature of other tasks so it can be used, along with the topology, to schedule the task. For example, if two tasks access the same data it may be more efficient to schedule them so that they are assigned to cores on the same socket so that they can share a cache rather than be assigned to cores on different sockets.

Figure 1:
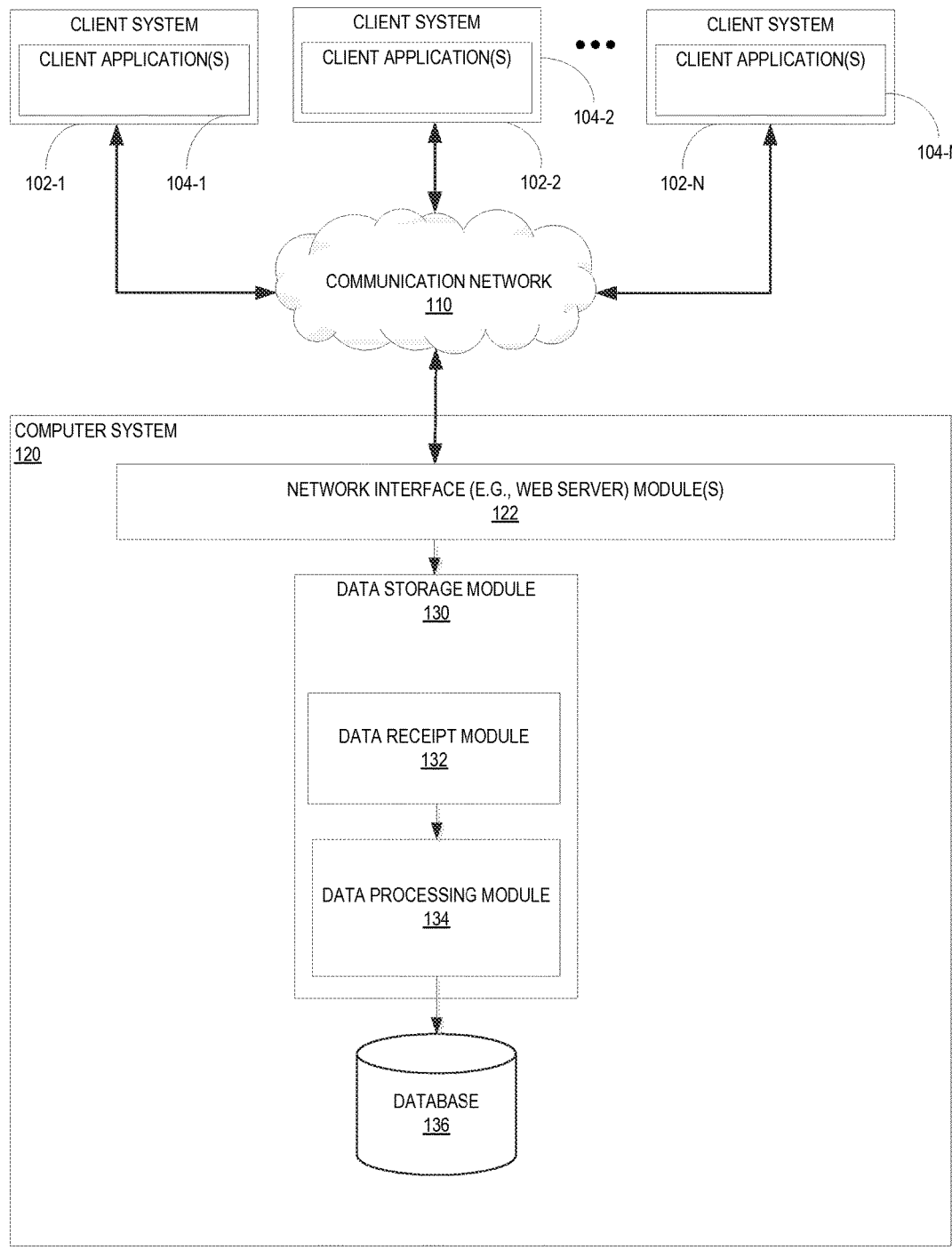
FIG. 1 is a block diagram depicting data storage computer system that includes various functional components of a computer system, in accordance with some example embodiments.

In an example embodiment, the various techniques for topology-aware scheduling are performed in a data storage computer system. FIG. 1 is a block diagram depicting data storage computer system 120 that includes various functional components of a computer system 120, in accordance with some example embodiments. The computer system 120 includes a network interface 122, a data storage module 130, and a data recovery module 140. The computer system 120 also is connected to one or more client systems 102-1 to 102-N. One or more communication networks 110 interconnect these components. The communication network 110 may be any of a variety of network types, including local area networks (LANs), wide area networks (WANs), wireless networks, wired networks, the Internet, personal area networks (PANs), or a combination of such networks.

In some example embodiments, a client system (e.g., one of 102-1 to 102-N) is an electronic device, such as a personal computer, a laptop, a smartphone, a tablet, a mobile phone or any other electronic device capable of communication over the communication network 110. Some client systems 102 include one or more client applications 104-1 to 104-N, which are executed by the client system 102-1. In some example embodiments, the client application(s) 104-1 to 104-N includes one or more applications from the set consisting of search applications, communication applications, productivity applications, storage applications, word processing applications, or any other useful applications. The client system 102-1 uses the client applications 104 to communicate with the computer system 120 and transmit data for storage to, and receive data from, the computer system 120.

In some example embodiments, there are a plurality of client systems (102-1 to 102-N) that all connect and interact with the computer system 120. Each of these transactions can occur simultaneously, depending on the bandwidth and processing power available to the computer system 120 and the various client systems 102-1 to 102-N.

In some example embodiments, as shown by way of example in FIG. 1, the computer system 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a computer system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three component type of architecture, the various example embodiments are by no means limited to this architecture.

As shown by way of example in FIG. 1, the computer system 120 includes a network interface module (e.g., a web server) 122, which receives data from various client systems 102, and communicates data back to the appropriate client systems 102 when appropriate. For example, the network interface module(s) 122 receives a data storage request from a client system 102 and transmits the data storage request to the data storage module 130. The data storage module 130 then stores the data in the database 136. The network interface 122 responds by sending a data receipt acknowledgement message to the client system 102.

As shown by way of example in FIG. 1, the data components include a database 136 for storing data. The application logic components include, in the data storage module 130, a data receipt module 132 and a data processing module 134.

The data receipt module 132 receives data storage and retrieval requests from client systems 102 through the network interface 122. The data receipt module 132 then passes the data to be stored to the data processing module 134. The data processing module 134 then analyzes the data storage request to produce specific data changes. The data changes are then transmitted to the database 136 for storage.

Figure 2:
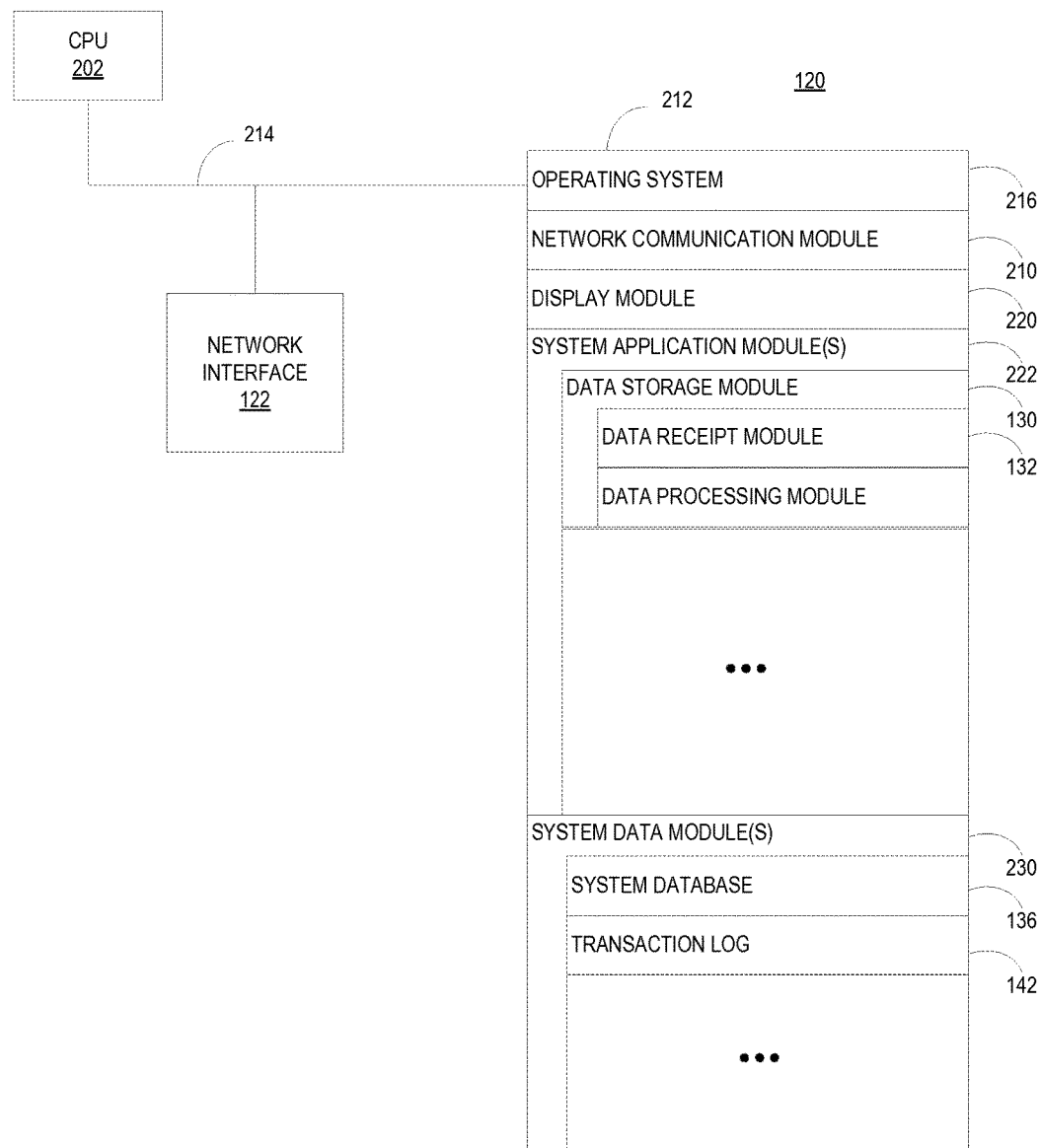
FIG. 2 is a block diagram illustrating a computer system, in accordance with some example embodiments.

FIG. 2 is a block diagram illustrating a computer system 120, in accordance with some example embodiments. The computer system 120 typically includes one or more processing units (CPUs) 202, one or more network interfaces 122, memory 212, and one or more communication buses 214 for interconnecting these components.

Memory 212 includes high-speed random access memory, such as dynamic random access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

Figure 3:
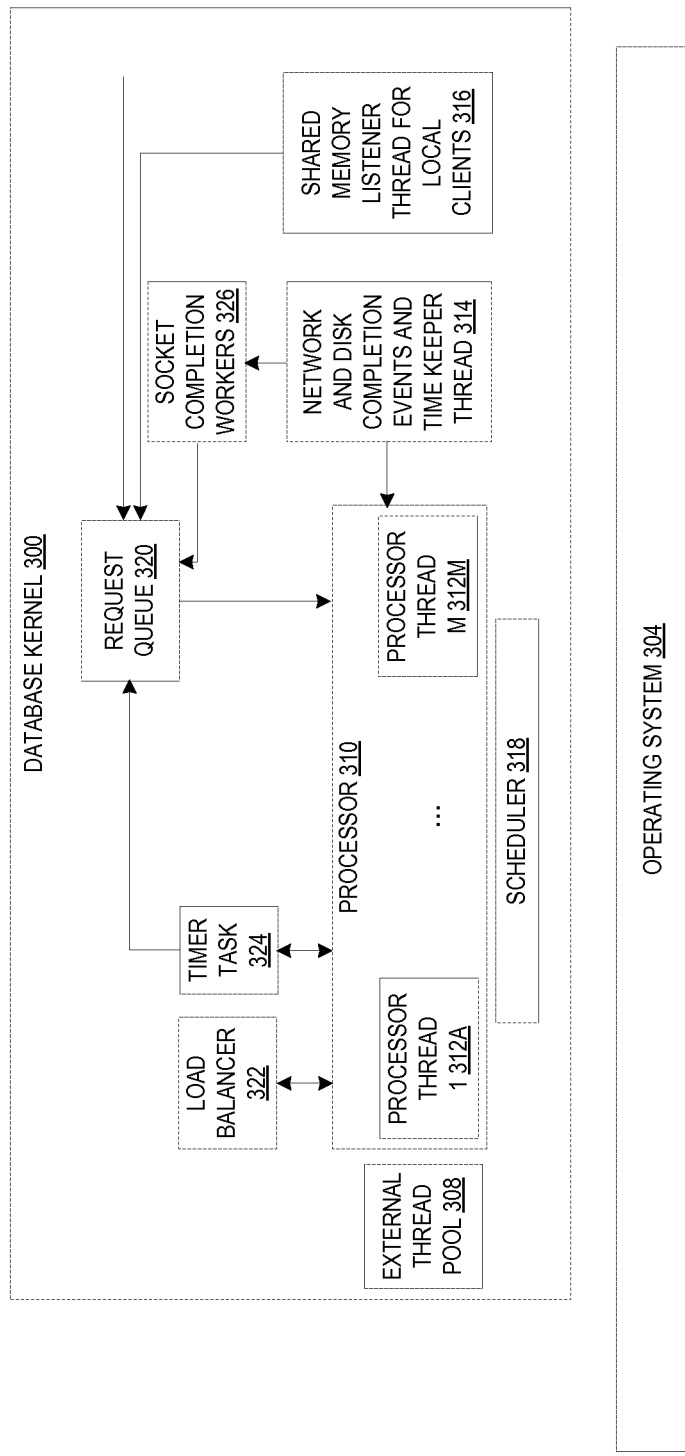
FIG. 3 is a block diagram illustrating a database kernel in accordance with an example embodiment.

In some example embodiments, memory 212, or the computer readable storage medium of memory 212, stores the following programs, modules, and data structures, or a subset thereof:

a. an operating system 216 that includes procedures for handling various basic system services and for performing hardware dependent tasks;

b. a network communication module 210 that is used for connecting the computer system 120 to other computers via the one or more communication network interfaces 122 (wired or wireless) and one or more communication networks 110, such as the Internet, other WANs, LANs, metropolitan area networks, etc.;

c. a display module 220 for enabling the information generated by the operating system 216 to be presented visually as needed;

d. one or more system application modules 222 for handling various aspects of storing and recovering data, including but not limited to:
  i. a data storage module 130 for receiving and storing data from one or more client systems (e.g., systems 102-1 to 102-N in FIG. 1) wherein the module further includes, but is not limited to:
    1. a data receipt module 132 for receiving data over a communication network 110 and determining whether it should be stored; and
    2. a data processing module 134 for applying received data changes to the system database 136;

e. a system data module 230 for storing data at the computer system 120, including but not limited to:
  i. a system database 136 for storing large amounts of data either produced by the computer system 120 or received from one or more client systems (e.g., system 102 from FIG. 1);
  ii. a transaction log 142 for storing a record of each transaction (e.g., data change) made to the data stored in the system database 136 so that the data set can be completely recovered in the event of a system failure or corruption;

FIG. 3 is a block diagram illustrating a database kernel 300 in accordance with an example embodiment. The database kernel 300 interacts with an operating system 304. The database kernel 300 has an external thread pool 308, which is also scheduled by the operating system 304. The operating system 304 additionally schedules network and disk completion events and a time keeper thread. The database kernel 300 has a pool of processor threads 310 that are setup so that there is a one-to-one mapping between each processor thread 312A-312M to each system processor. No two process threads 312A-312M execute on the same system processor.

A scheduler 318 then may utilize the topology in order to schedule one or more tasks from the request queue 320 into the processor threads 312A-312M. The scheduler 318 can also manage the load balancer 322, timer task 324, and socket completion workers 326.

In order to modify the scheduler 318 to take into account the topology of the system, in an example embodiment, the scheduler takes as input an array that represents all processors 310 in the system and a CPUTopology object. The CPUToplogy Object describes the hierarchy of the processors 310 in the system and possibly their associated resources such as caches. The scheduler implements a scheduling policy that depends on the CPUTopology object. Of course, numerous scheduling possibilities may be used and this disclosure shall not be read to be limited to a single scheduling possibility.

For a "symmetric" scheduler, all processors 310 are treated equally and the scheduling algorithm treats all processors as equivalent and divides tasks equally across all processors 310. For a topology-aware scheduler 318, processors may not be treated as equivalent. In an example embodiment, the topology-aware scheduler may implement a policy such that tasks are assigned to use as many sockets as possible before assigning multiple tasks to the same socket.

In a first example static policy, an iterator representing the topology of the system is created. Each node is then visited and assigned a value that represents the score that is calculated for it under the topology-aware scheduling policy. The score of each node (i.e., a logical processor) may, in an example embodiment, be an unsigned integer with 32 bits calculated by zeroing out bit 31 to bit 24, then using its thread id as bit 23 to bit 16, its core id as bit 15 to bit 8, and its socket id as bit 7 to bit 0. For example, a logical CPU with socket id 1, core id 0 and thread id 1 gets a score of 0x00010001. The node that has lower scores has higher priority under the topology-aware scheduling policy. This means that the scheduler 318 always tries to use as many sockets as possible and then use as many cores as possible. An ascending-sorted CPU score list is created every time the topology of the system is changed. This resulting sorted list also serves as the 'desired' CPU list of the algorithm and the load balancing algorithm will attempt to always keep tasks running at the left most (smallest score) side of the list first.

In a second example static policy, users can provide rules so that, for example, specific tasks that are known to be performing computations on the same data will be kept together on the same socket or on specific sockets in order to improve the cache hit ratio. Alternatively, the user could specify that certain tasks must execute on different sockets. The user could also specify that certain tasks must execute on a specific processor or one of a specific set of processors. All tasks, if any, for which the user has not specified rules can be assigned to processors automatically by the scheduler as described above.

In a third example static policy, all cores on one socket are used before attempting to use other cores on different sockets. In the score algorithm described above, this policy could be achieved by zeroing out bits 31 to 24, then using its thread identification as bits 23 to 16, then the socket identification in bits 15 to 8 and its core identification in bits 7 to 0.

In a fourth example static policy, the policy could monitor workload and/or CPU statistics (such as cache misses) and perform scheduling decisions that attempt to improve workload performance, for example by reducing CPU cache misses.

There are other impacts and benefits of scheduling policies that can be maximized or minimized as desired (i.e., "optimal" may be measured in a measure other than performance/speed of execution). For example, in an environment where power consumption is critical, a scheduling policy can optimize placement of tasks in order to reduce power consumption by processors. The third example static policy described above may achieve this by allowing more sockets to remain idle. Alternatively, in an environment where CPU cycles are metered and charged to applications, a scheduling policy could decide to place tasks in a manner that reduces monetary costs. For example, if a hosting system bills for CPU usage base on the number of socket-hours used, the policy described in the third example static policy would use fewer sockets than the policy described in the first example static policy.

With respect to reevalutating the current system when workloads change and/or tasks terminate, an example approach would be to use the first or third example static policy and always keep the N left-most processors busy when there are N tasks. For example, if processors 0, 1, and 2 are busy and processors 3, 4, 5, 6, and 7 are idle at the time processor 1 becomes idle, then the task on processor 2 could be moved onto processor 1, thereby keeping the processors with the lowest score (highest priority) occupied. Here, processor "0" refers to the processor with the lowest score, processor 1 refers to the processor with the next higher score, etc.

The scheduler may periodically adjust itself where tasks execute to enforce the scheduling policy. For example, tasks can complete or block and leave a non-optimal configuration which needs to be corrected. The scheduler may be designed to periodically check the distribution of tasks and rebalance the tasks accordingly to achieve the goals of the desired policy. It should be noted that throughout this disclosure, the term "terminated" with regards to a task shall be interpreted broadly to cover any state in which the task is unable to run, such as the task being officially ended, the task completing on its own, or the task being blocked.

In an example embodiment, performance of the various components in the topology may be monitored in real-time and this information may be fed to the scheduler 318 to adjust the scheduled tasks or execution units in a dynamic fashion. In this manner, the scheduler 318 may schedule execution units based on (1) topology; (2) workload; and (3) actual performance.

In an example embodiment, an operation system scheduler may be completely bypassed by the improved scheduler 318 described herein. Specifically, the hands of the operating system scheduler may be tied by, for example, setting an affinity mask to block all operating system scheduling functions.

Figure 4:
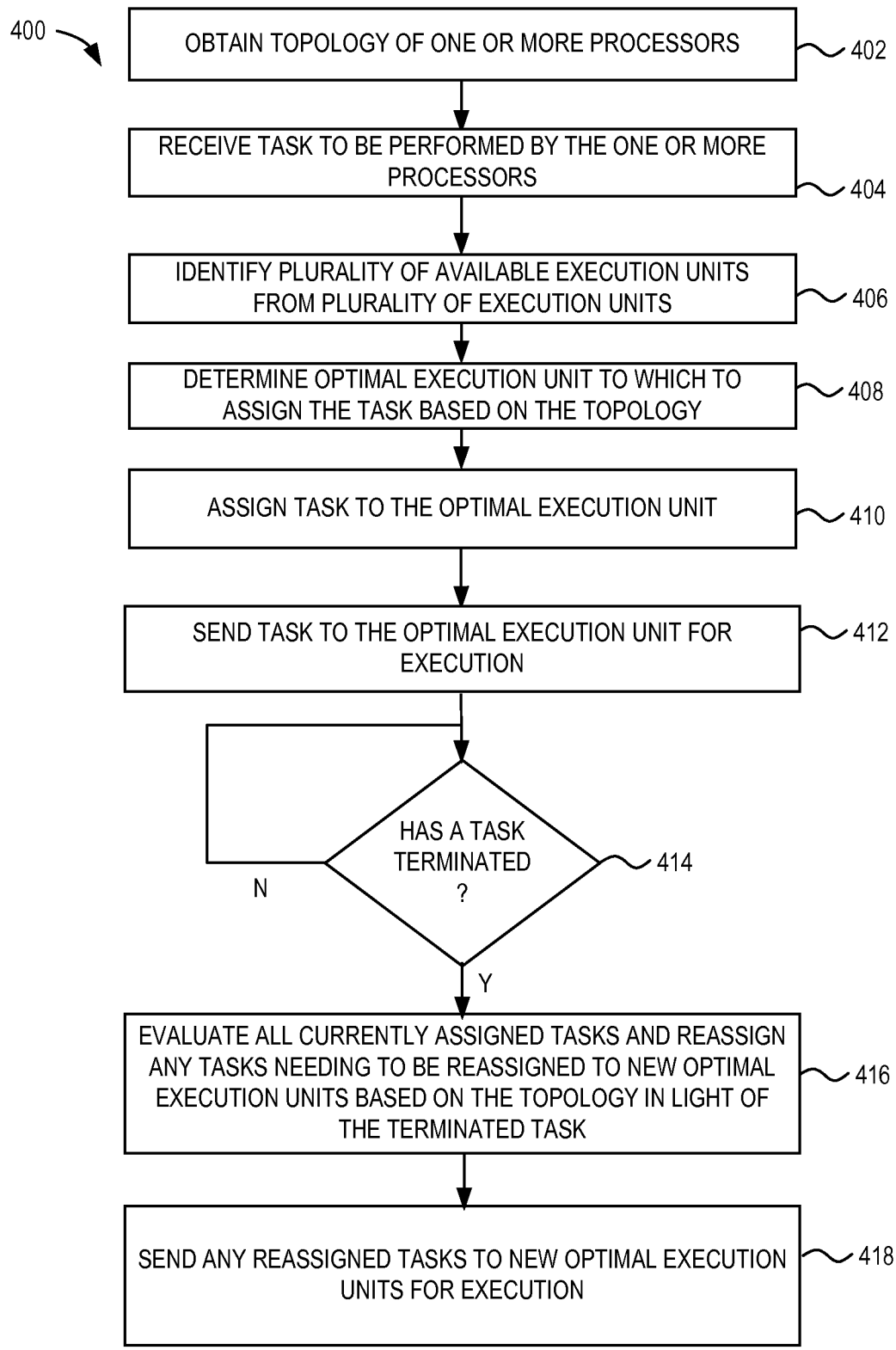
FIG. 4 is a flow diagram illustrating a method, in accordance with an example embodiment, of operating a task scheduler for one or more processors.

FIG. 4 is a flow diagram illustrating a method 400, in accordance with an example embodiment, of operating a task scheduler 318 for one or more processors 310. At operation 402, a topology of one or more processors 310 is obtained. The topology indicates a plurality of execution units and physical resources associated with each of the plurality of execution units. At operation 404, a task to be performed by the one or more processors 310 is received. At operation 406, a plurality of available execution units from the plurality of execution units are identified. In this manner, any execution units that are busy or otherwise unavailable to execute the task can be identified for later exclusion from consideration during task assignment. At operation 408, an optimal execution unit, from the plurality of execution units, to which to assign the task, is determined based on the topology. It should be noted that the term "optimal" as used throughout this disclosure is merely intended to denote the particular execution unit selected based on the topology and is not intended to reflect any sort of determination that a particular execution unit is or must be the single most optimal selection to choose. In other words, the term "optimal" in this context shall be interpreted broadly to mean any execution unit selected on the basis of the topology, whether the execution unit is the single most optimal selection or merely near or somewhat optimal.

In one example embodiment, this determination is based solely on the topology. In another example embodiment, this determination is based on a combination of the topology and an analysis of the underlying nature of the task and a comparison to the natures of one or more other tasks previously assigned to execution units of the one or more processors 310.

At operation 410, the task is assigned to the optimal execution unit. At operation 412, the task is sent to the optimal execution unit for execution.

As described above, periodically the task scheduler 318 can periodically monitor the tasks to see if any have terminated. Thus, at operation 414, the task scheduler 318 determines if any tasks have terminated. If not, the process may continue to loop to operation 414 until a terminated task is detected. Once a terminated task is detected, at operation 416 all currently assigned tasks can be evaluated. Any tasks needing to be reassigned to new optimal execution units based on the topology in light of the terminated task are then reassigned. At operation 418, any reassigned tasks are sent to new optimal execution units for execution.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems 120 (e.g., a standalone computer system, a client computer system, or a server computer system) or one or more hardware modules of a computer system (e.g., a processor 310 or a group of processors 310) may be configured by software (e.g., an application or application portion) as a hardware module that operates to perform certain operations as described herein.

In some embodiments, a hardware module may be implemented mechanically, electronically, or any suitable combination thereof for example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor 310 or other programmable processor 310. Once configured by such software, hardware modules become specific machines (or specific components of a machine) uniquely tailored to perform the configured functions and are no longer general-purpose processors 310. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 310 configured by software to become a special-purpose processor, the general-purpose processor 310 may be configured as respectively different special-purpose processors (e.g., comprising different hardware modules) at different times. Software accordingly configures a particular processor or processors 310, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 310 that are temporarily configured (e.g., by software) or permanently configured to perform the relevant operations. Whether temporarily or permanently configured, such processors 310 may constitute processor-implemented modules that operate to perform one or more operations or functions described herein. As used herein, "processor-implemented module" refers to a hardware module implemented using one or more processors 310.

Similarly, the methods described herein may be at least partially processor-implemented, with a particular processor or processors 310 being an example of hardware. For example, at least some of the operations of a method may be performed by one or more processors 310 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors 310), with these operations being accessible via a network 110 (e.g., the Internet) and via one or more appropriate interfaces (e.g., an application program interface (API)).

The performance of certain of the operations may be distributed among the processors 310, not only residing within a single machine, but deployed across a number of machines. In some example embodiments, the processors 310 or processor-implemented modules may be located in a single geographic location (e.g., within a home environment, an office environment, or a server farm). In other example embodiments, the processors 310 or processor-implemented modules may be distributed across a number of geographic locations.

Machine and Software Architecture

The modules, methods, applications and so forth described in conjunction with FIG. 4 are implemented in some embodiments in the context of a machine and an associated software architecture 502. The sections below describe representative software architecture(s) 502 and machine (e.g., hardware) architecture that are suitable for use with the disclosed embodiments.

Software architectures 502 are used in conjunction with hardware architectures to create devices and machines tailored to particular purposes. For example, a particular hardware architecture coupled with a particular software architecture 502 will create a mobile device, such as a mobile phone, tablet device, or so forth. A slightly different hardware and software architecture 502 may yield a smart device for use in the "internet of things." While yet another combination produces a server computer for use within a cloud computing architecture. Not all combinations of such software and hardware architectures are presented here as those of skill in the art can readily understand how to implement the subject matter of the disclosure in different contexts from the disclosure contained herein.

Software Architecture

Figure 5:
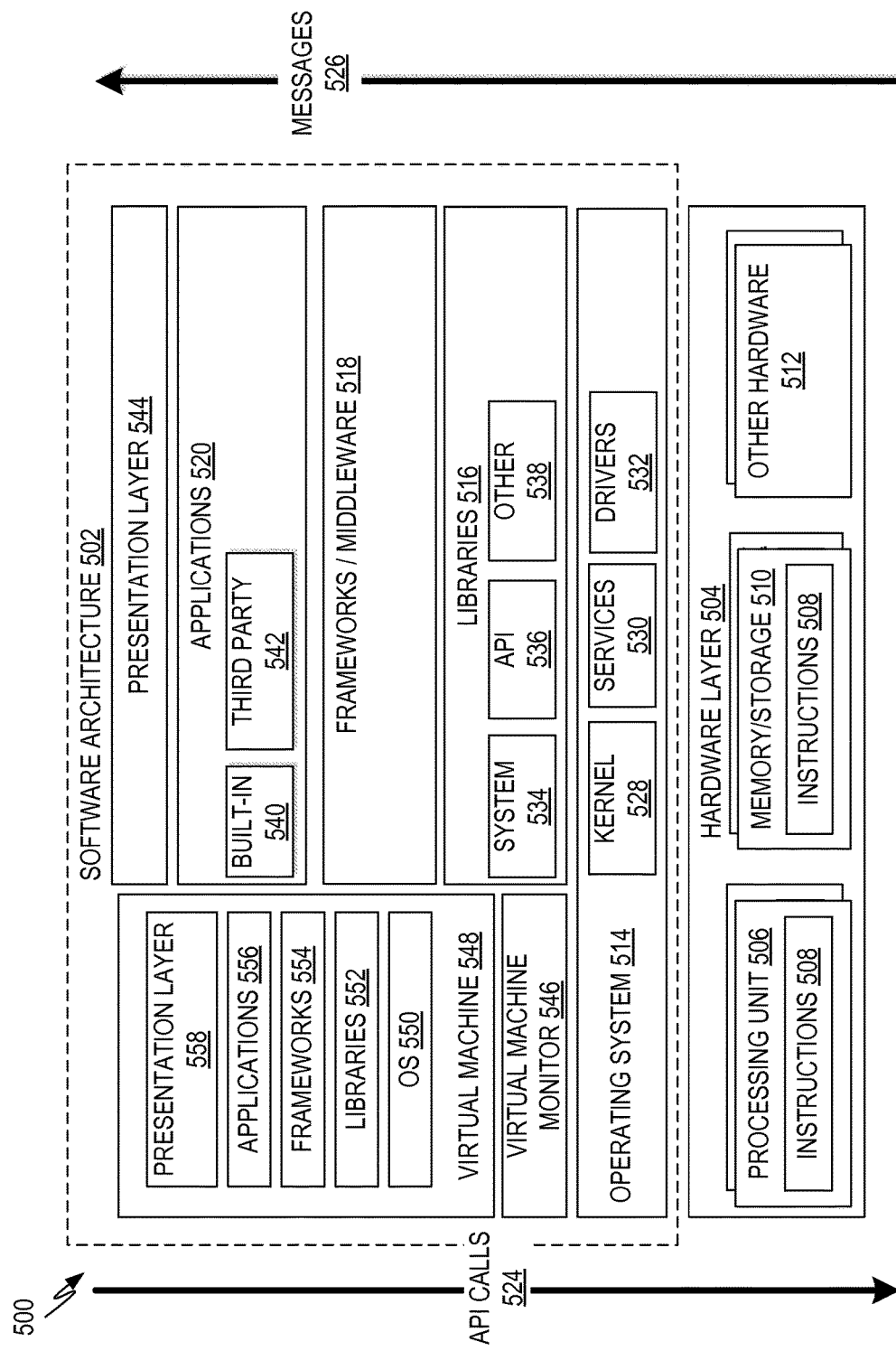
FIG. 5 is a block diagram illustrating a representative software architecture 502, which may be used in conjunction with various hardware architectures herein described.

FIG. 5 is a block diagram 500 illustrating a representative software architecture 502, which may be used in conjunction with various hardware architectures herein described. FIG. 5 is merely a non-limiting example of a software architecture 502 and it will be appreciated that many other architectures may be implemented to facilitate the functionality described herein. The software architecture 502 may be executing on hardware such as machine 600 of FIG. 6 that includes, among other things, processors 610, memory 630, and I/O components 650. A representative hardware layer 504 is illustrated and can represent, for example, the machine 600 of FIG. 6. The representative hardware layer 504 comprises one or more processing units 506 having associated executable instructions 508. Executable instructions 508 represent the executable instructions of the software architecture 502, including implementation of the methods, modules and so forth of FIGS. 1-4. Hardware layer 504 also includes memory and/or storage modules 510, which also have executable instructions 508. Hardware layer 504 may also comprise other hardware as indicated by 512 which represents any other hardware of the hardware layer 504, such as the other hardware illustrated as part of machine 600.

In the example architecture of FIG. 5, the software 502 may be conceptualized as a stack of layers where each layer provides particular functionality. For example, the software 502 may include layers such as an operating system 514, libraries 516, frameworks/middleware 518, applications 520 and presentation layer 522. Operationally, the applications 520 and/or other components within the layers may invoke application programming interface (API) calls 524 through the software stack and receive a response, returned values, and so forth illustrated as messages 526 in response to the API calls 524. The layers illustrated are representative in nature and not all software architectures 502 have all layers. For example, some mobile or special purpose operating systems 514 may not provide a frameworks/middleware layer 518, while others may provide such a layer. Other software architectures 502 may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than to interfacing directly with the underlying operating system 514 functionality (e.g., kernel 528, services 530 and/or drivers 532). The libraries 516 may include system 534 libraries (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., Database Shared Library (DBSL) that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 and/or other software components/modules. For example, the frameworks 518 may provide various graphic user interface (GUI) functions, high-level resource management, high-level location services, and so forth. The frameworks 518 may provide a broad spectrum of other APIs that may be utilized by the applications 520 and/or other software components/modules, some of which may be specific to a particular operating system 514 or platform.

The applications 520 include built-in applications 540 and/or third party applications 542. Examples of representative built-in applications 540 may include, but are not limited to, a contacts application, a browser application, a book reader application, a location application, a media application, a messaging application, and/or a game application. Third party applications 542 may include any of the built in applications 540 as well as a broad assortment of other applications 520. In a specific example, the third party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 542 may invoke the API calls 524 provided by the mobile operating system such as operating system 514 to facilitate functionality described herein.

The applications 520 may utilize built in operating system 514 functions (e.g., kernel 528, services 530 and/or drivers 532), libraries 516 (e.g., system 534, APIs 536, and other libraries 538), and frameworks/middleware 518 to create user interfaces to interact with users of the system. Alternatively, or additionally, in some systems, interactions with a user may occur through a presentation layer, such as presentation layer 544. In these systems, the application/module "logic" can be separated from the aspects of the application/module that interact with a user.

Some software architectures 502 utilize virtual machines. In the example of FIG. 5, this is illustrated by virtual machine 548. A virtual machine creates a software environment where applications/modules can execute as if they were executing on a hardware machine (such as the machine 600 of FIG. 6, for example). A virtual machine is hosted by a host operating system (operating system 514 in FIG. 5) and typically, although not always, has a virtual machine monitor 546, which manages the operation of the virtual machine 548 as well as the interface with the host operating system (i.e., operating system 514). A software architecture 502 executes within the virtual machine 548 such as an operating system 550, libraries 552, frameworks/middleware 554, applications 556 and/or presentation layer 558. These layers of software architecture 502 executing within the virtual machine 548 can be the same as corresponding layers previously described or may be different.

Example Machine Architecture and Machine-Readable Medium

Figure 6:
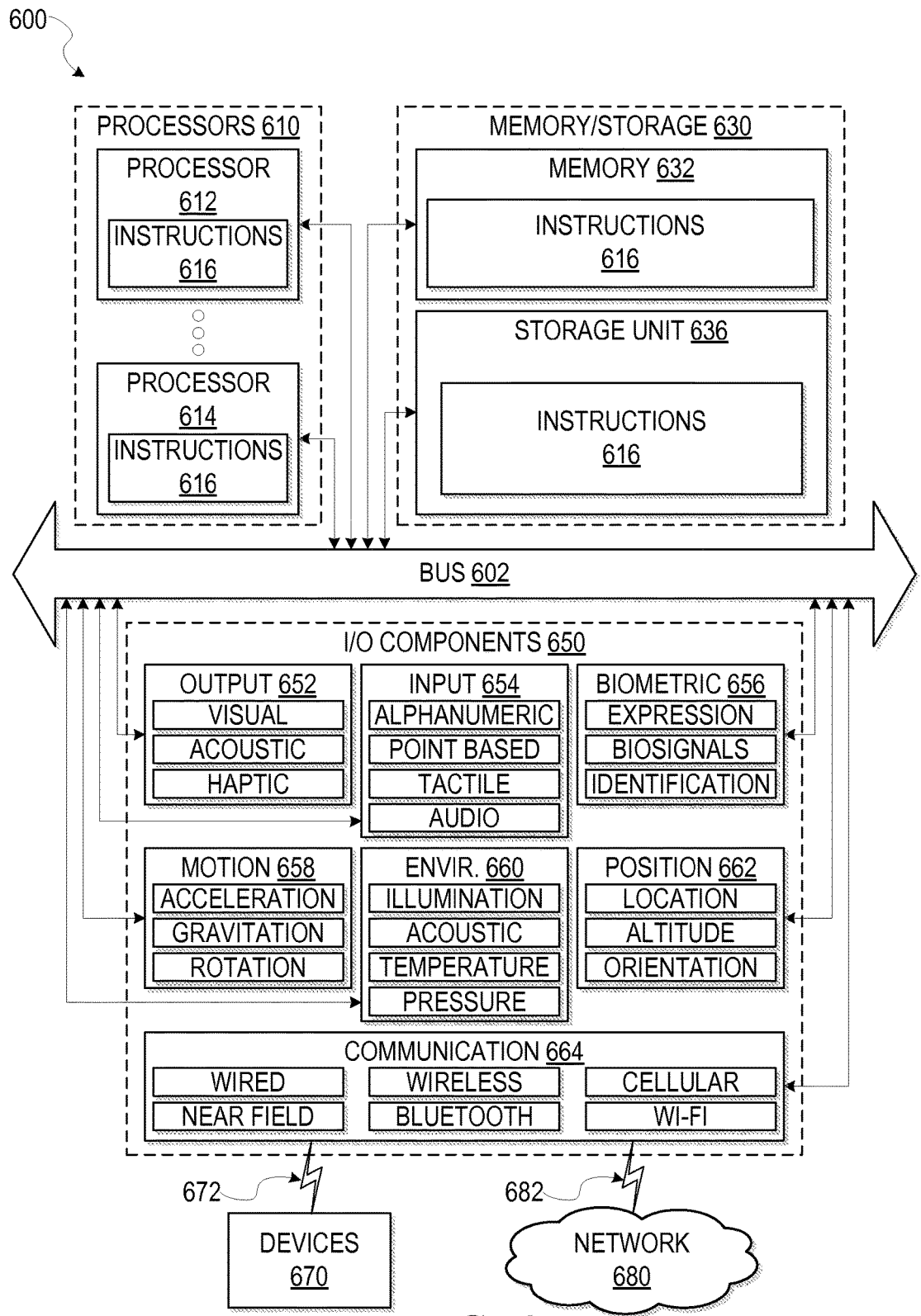
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system 120, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the flow diagrams of FIG. 4. Additionally, or alternatively, the instructions 616 may implement the various modules described in the disclosure, and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 612 and processor 614 that may execute instructions 616. The term "processor" is intended to include a multi-core processor 610 that may comprise two or more independent processors 610 (sometimes referred to as "cores") that may execute instructions 616 contemporaneously. Although FIG. 6 shows multiple processors 612, 614, the machine 600 may include a single processor 610 with a single core, a single processor 610 with multiple cores (e.g., a multi-core processor), multiple processors 610 with a single core, multiple processors 610 with multiples cores, or any combination thereo.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor 610's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions 616 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof the term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines 600 such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine 600 or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of operating a task scheduler for one or more processors, the method comprising:
   obtaining a topology of the one or more processors, the topology indicating a plurality of execution units and physical resources associated with each of the plurality of execution units;
   receiving a task to be performed by the one or more processors;
   identifying a plurality of available execution units from the plurality of execution units;
   determining an optimal execution unit, from the plurality of execution units, to which to assign the task, based on the topology and one or more user-specified rules, wherein one of the user-specified rules specifies that a specific task be performed on a specific socket;
   assigning the task to the optimal execution unit; and
   sending the task to the optimal execution unit for execution.

2. The method of claim 1, wherein the determining an optimal execution unit includes:
   analyzing a nature of the task;
   comparing the nature of the task to natures of one or more other tasks previously assigned to execution units of the one or more processors; and
   determining an optimal execution unit; from the plurality of execution units, to which to assign the task, based on the topology and based on the comparison of the nature of the task to natures of one or more other tasks previously assigned to execution units of the one or more processors.

3. The method of claim 2, wherein the nature of the underling task includes the work the task is set to perform.

4. The method of claim 3, wherein the work the task is set to perform includes an identification of cache data to access and the comparing includes determining that the cache data to access for the task to be performed overlaps with cache data used by one or more of the one or more other tasks previously assigned to execution units of the one or more processors.

5. The method of claim 1, wherein the plurality of execution units include one or more cores.

6. The method of claim 1, wherein the plurality of execution units include one or more threads.

7. The method of claim 1, wherein one of the user-specified rules specifies that a second specific task be performed on one or more specific processors.

8. A system comprising:
   a plurality of execution units;
   one or more physical resources available for use by the plurality of execution units while executing tasks;
   a task scheduler configured to:
   obtain a topology of the system, the topology indicating the plurality of execution units and the one or more physical resources;
   receive a task to be performed by the one or more processors;
   identify a plurality of available execution units from the plurality of execution units;
   determine an optimal execution unit, from the plurality of execution units, to which to assign the task, based on the topology and one or more user-specified rules, wherein one of the user-specified rules specifies that a specific task be performed on a specific socket;
   assign the task to the optimal execution unit; and
   send the task to the optimal execution unit for execution.

9. The system of claim 8, wherein the system is located on a database server.

10. The system of claim 8, further comprising a task queue containing a plurality of tasks to be assigned and the task is received from the task queue.

11. The system of claim 8, wherein the task scheduler utilizes multiple scheduler classes, each scheduler class having its own load balancing algorithm based on the topology.

12. A non-transitory machine-readable storage medium comprising instructions, which when implemented by one or more machines, cause the one or more machines to perform operations comprising:
   obtaining a topology of one or more processors, the topology indicating a plurality of execution units and physical resources associated with each of the plurality of execution units;
   identifying a plurality of available execution units from the plurality of execution units;
   in response to a determination that a task has terminated, determining an optimal execution unit for each of a plurality of nonterminated tasks, from the plurality of execution units, to which to assign each of the plurality of nonterminated tasks, based on the topology and one or more user-specified rules, wherein one of the user-specified rules specifies that a specific task be performed on a specific socket;
   assigning each of the plurality of nonterminated tasks to the optimal execution unit corresponding to each; and sending any of the plurality of nonterminated tasks whose optimal execution units have changed to the optimal execution unit corresponding to each.

13. The non-transitory machine-readable storage medium of claim 12, wherein the determining an optimal execution unit for a task includes:
    analyzing a nature of the task;
    comparing the nature of the task to natures of one or more other tasks previously assigned to execution units of the one or more processors; and
    determining an optimal execution unit, from the plurality of execution units, to which to assign the task, based on the topology and based on the comparison of the nature of the task to natures of one or more other tasks previously assigned to execution units of the one or more processors.

14. The non-transitory machine-readable storage medium of claim 13, wherein the nature of each underling task includes the work the task is set to perform.

15. The non-transitory machine-readable storage medium of claim 14, wherein the work each task is set to perform includes an identification of cache data to access and the comparing includes determining that the cache data to access for the task to be performed overlaps with cache data used by one or more of the one or more other tasks previously assigned to execution units of the one or more processors.

16. The non-transitory machine-readable storage medium of claim 12, wherein the plurality of execution units include one or more cores.

17. The non-transitory machine-readable storage medium of claim 12, wherein the plurality of execution units include one or more threads.

18. The non-transitory machine-readable storage medium of claim 12, wherein one of the user-specified rules specifies that a second specific task be performed on one or more specific processors.

* * * * *